(12) United States Patent
Garg et al.

(10) Patent No.: US 12,489,795 B2
(45) Date of Patent: Dec. 2, 2025

(54) SYSTEMS AND METHODS FOR AUTO-ESTABLISHING SECURE CONNECTIONS FOR INTERRUPTED DATA TRANSMISSIONS

(71) Applicant: BANK OF AMERICA CORPORATION, Charlotte, NC (US)

(72) Inventors: Saurabh Garg, Haryana (IN); Sandeep Kumar Chauhan, Miyapur Hyderabad (IN); Shailendra Singh, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/624,664

(22) Filed: Apr. 2, 2024

(65) Prior Publication Data
US 2025/0310380 A1    Oct. 2, 2025

(51) Int. Cl.
*H04L 9/40*    (2022.01)

(52) U.S. Cl.
CPC .......... *H04L 63/20* (2013.01); *H04L 63/0435* (2013.01); *H04L 63/107* (2013.01)

(58) Field of Classification Search
CPC .... H04L 63/20; H04L 63/0435; H04L 63/107
See application file for complete search history.

(56) References Cited

U.S. PATENT DOCUMENTS

| 5,903,652 | A | * | 5/1999 | Mital | G06Q 20/0855 |
| | | | | | 705/26.25 |
| 7,069,438 | B2 | | 6/2006 | Balabine | |
| 7,457,415 | B2 | | 11/2008 | Reitmeier | |
| 9,998,434 | B2 | | 6/2018 | Verzun | |
| 10,270,570 | B2 | | 4/2019 | Liu | |
| 10,348,136 | B2 | | 7/2019 | John | |

(Continued)

FOREIGN PATENT DOCUMENTS

| CN | 101335740 A | 12/2008 |
| CN | 108924887 A | 11/2018 |

(Continued)

*Primary Examiner* — John B King
(74) *Attorney, Agent, or Firm* — Moore & Van Allen PLLC; Lauren M. Stokes

(57) ABSTRACT

Systems, computer program products, and methods are described herein for auto-establishing secure connections for interrupted data transmissions. The present disclosure is configured to identify an interrupted data transmission comprising a transmission data request; transform the transmission data request to a distributed channel data format to generate a distributed channel data request; transmit the distributed channel data request to an active acquirer switching platform; identify, by the active acquirer switching platform, an acquirer server(s); select, by the active acquirer switching platform, a primary active acquirer server for the distributed channel data request; generate, based on the distributed channel data request and the primary active acquirer server, an acquirer data packet comprising authorized data from at least the transmission data request and device handler data of the primary active acquirer server in the distributed channel data format; and transmit the acquirer data packet to the primary active acquirer server.

20 Claims, 9 Drawing Sheets

(56) References Cited

U.S. PATENT DOCUMENTS

| | | |
|---|---|---|
| 10,455,558 B2 | 10/2019 | Rico Alvarino |
| RE47,867 E | 2/2020 | Harvey |
| 10,649,798 B2 | 5/2020 | Lin |
| 10,713,676 B1 | 7/2020 | Chao |
| 10,853,519 B2 | 12/2020 | Pan |
| 10,986,549 B2 | 4/2021 | Wang |
| 11,362,851 B2 | 6/2022 | Ansari |
| 11,419,025 B2 | 8/2022 | Xu |
| 11,481,696 B2 | 10/2022 | Jafri |
| 2001/0005809 A1* | 6/2001 | Ito .................. G08G 1/096894 701/411 |
| 2003/0028887 A1* | 2/2003 | Frouin .............. H04L 12/40117 725/74 |
| 2003/0147369 A1* | 8/2003 | Singh .................. H04W 12/033 370/353 |
| 2005/0055577 A1* | 3/2005 | Wesemann .......... H04L 63/0272 726/4 |
| 2006/0291471 A1* | 12/2006 | Heuer ..................... H04L 51/04 370/395.5 |
| 2012/0016658 A1 | 1/2012 | Wu |
| 2017/0289156 A1* | 10/2017 | McClintock ............ H04L 63/08 |
| 2018/0060269 A1 | 3/2018 | Kessler |
| 2020/0146036 A1* | 5/2020 | Gao ....................... H04L 1/1819 |
| 2020/0162536 A1* | 5/2020 | Vincent ................ H04L 65/611 |
| 2020/0322287 A1 | 10/2020 | Connor |
| 2023/0222074 A1* | 7/2023 | Takahashi ........... G06F 13/4282 710/260 |
| 2024/0078802 A1* | 3/2024 | Huang ................. B64C 39/024 |
| 2024/0291835 A1* | 8/2024 | Sethi ................. H04L 63/1425 |
| 2025/0077653 A1* | 3/2025 | Farley ................. G06F 9/5011 |

FOREIGN PATENT DOCUMENTS

| | | | | |
|---|---|---|---|---|
| EP | 3716566 A1 * | 9/2020 | ............ | G06F 21/44 |
| ES | 2875786 T3 | 11/2021 | | |

\* cited by examiner

SYSTEMS AND METHODS FOR AUTO-ESTABLISHING SECURE CONNECTIONS FOR INTERRUPTED DATA TRANSMISSIONS

TECHNOLOGICAL FIELD

Example embodiments of the present disclosure relate to auto-establishing secure connections for interrupted data transmissions.

BACKGROUND

During secure data transmissions (such as data transmissions comprising data and information that must be protected due to its importance and sensitivity) interruptions may occur when the data is transmitted to its intended recipient and the intended recipient's server is down or overloaded. Thus, and in order to prevent such secure data transmissions from being interrupted, a different acquirer server may be identified to receive some or all of the data in the original secure data transmission that was interrupted without downtime or delay. Thus, a system, computer-program product, and/or computer-implemented method for auto-establishing secure connections for interrupted data transmission which can accurately, efficiently, and securely identify an active acquirer server to receive data of the interrupted data transmission, and transmit the data of the interrupted data transmission in a secure and efficient manner.

Applicant has identified a number of deficiencies and problems associated with establishing secure connections when interruptions occur in secure data transmissions. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for auto-establishing secure connections for interrupted data transmissions.

In one aspect, a system for auto-establishing secure connections for interrupted data transmissions is provided. In some embodiments, the system may comprise: a processing device; a non-transitory storage device containing instructions when executed by the processing device, causes the processing device to perform the steps of: identify an interrupted data transmission comprising a transmission data request; transform the transmission data request to a distributed channel data format to generate a distributed channel data request; transmit the distributed channel data request to an active acquirer switching platform; identify, by the active acquirer switching platform, at least one available acquirer server; select, by the active acquirer switching platform, a primary active acquirer server for the distributed channel data request, wherein the primary active acquirer server is selected based on at least one of a priority based acquirer connection and an optimal route; generate, based on the distributed channel data request and the primary active acquirer server, an acquirer data packet comprising authorized data from at least the transmission data request and device handler data of the primary active acquirer server in the distributed channel data format; and transmit the acquirer data packet to the primary active acquirer server.

In some embodiments, the processing device is further configured to perform the steps of: determine whether an interruption server of the interrupted data transmission can receive the transmission data request; and transmit, in an instance where the interruption server can receive the transmission data request, the acquirer data packet to the interruption server.

In some embodiments, the interruption data transmission is based on a recipient server interruption.

In some embodiments, the distributed channel data format is a new distribution capability format.

In some embodiments, the optimal route is based on a geographic proximity between a server for a recipient server interruption and the primary active acquirer server.

In some embodiments, the priority based acquirer connection comprises a dual signature shared between at least one active acquirer entity associated with the at least one active acquirer server and an interrupted entity associated with the interrupted data transmission.

In some embodiments, the processing device is further configured to perform the steps of: generate a hash encryption; apply the hash encryption to the distributed channel data request; and transmit the hash encrypted distributed channel data request to the primary active acquirer server.

In some embodiments, the processing device is further configured to perform the steps of: switch, using at least one device handler, an interrupted data transmission network to the primary active acquirer network associated with primary active acquirer server.

In some embodiments, the processing device is further configured to perform the steps of: generate a distributed ledger comprising a ledger entry comprising at least the interrupted data transmission, the optimal route, the priority based acquirer connection, and the primary active acquirer server.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
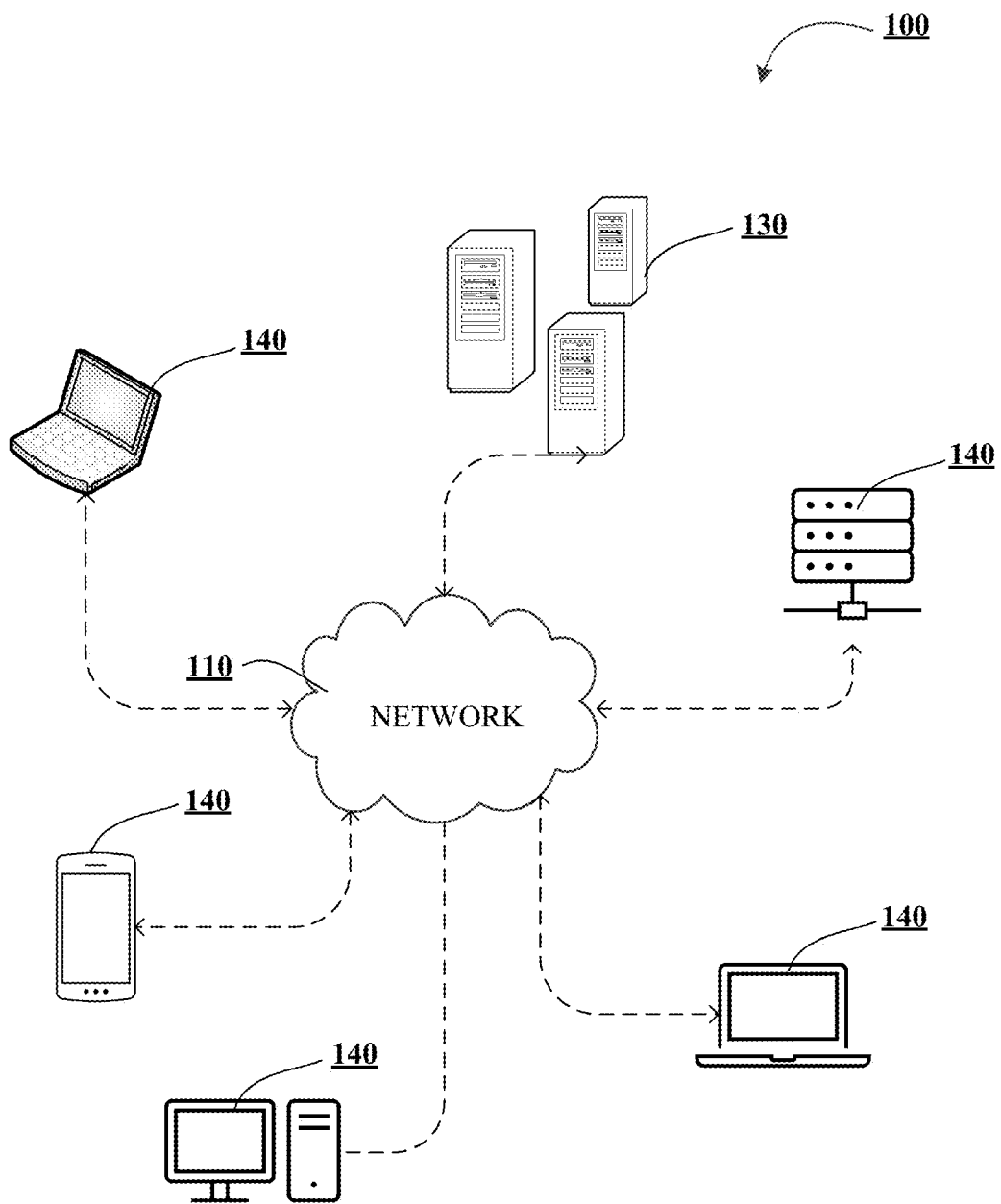
Figure 1B:
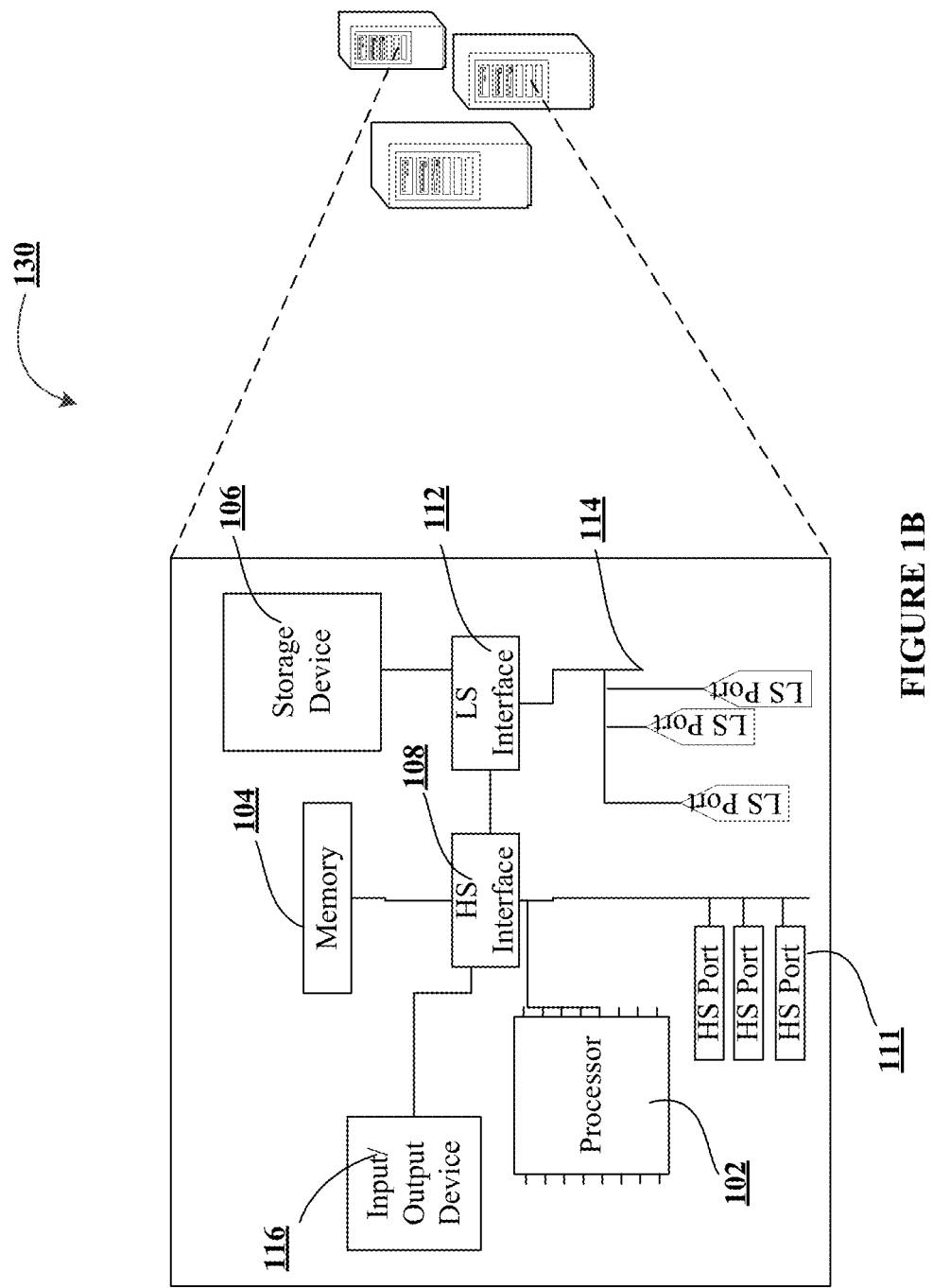
Figure 1C:
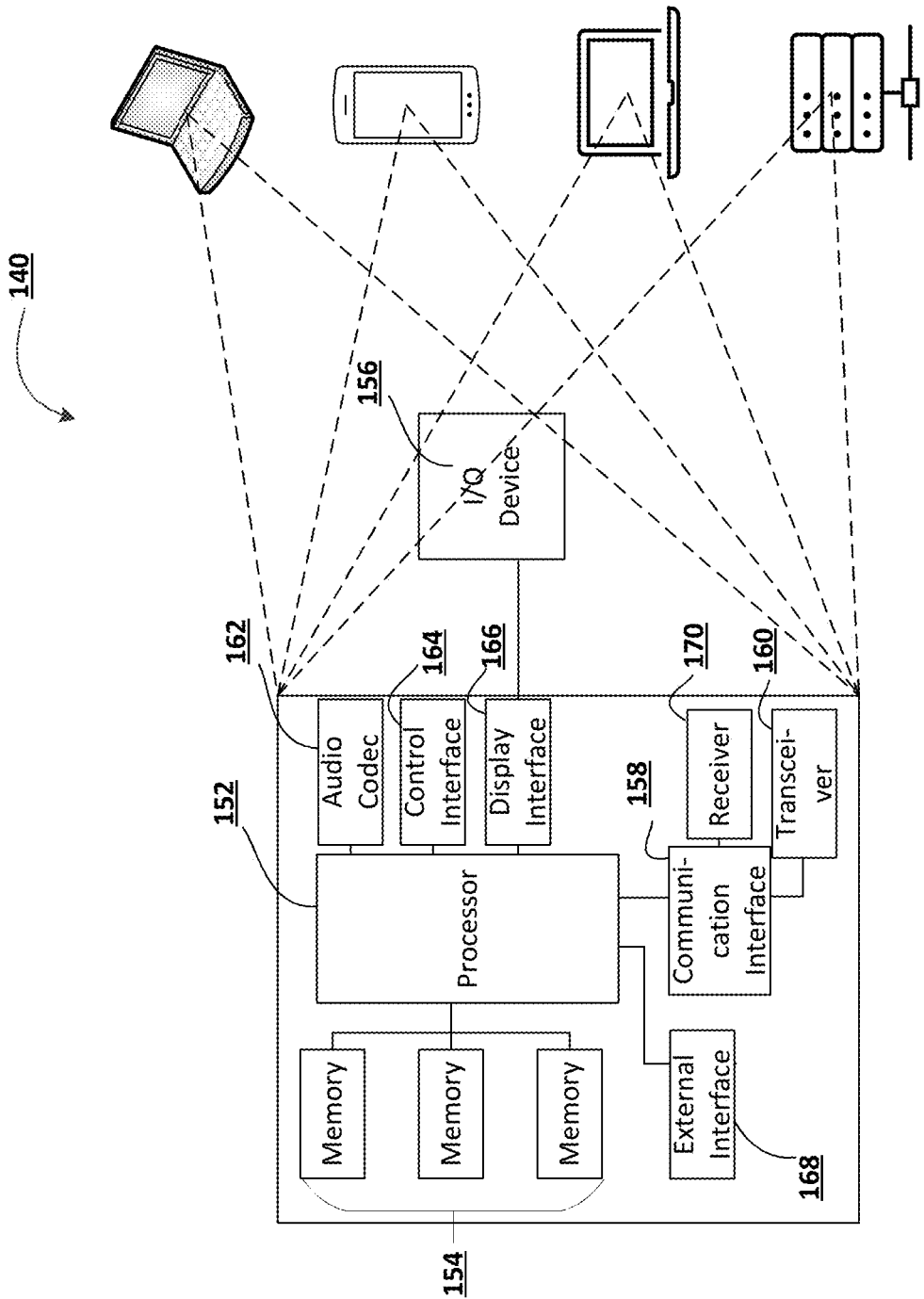
Figure 2:
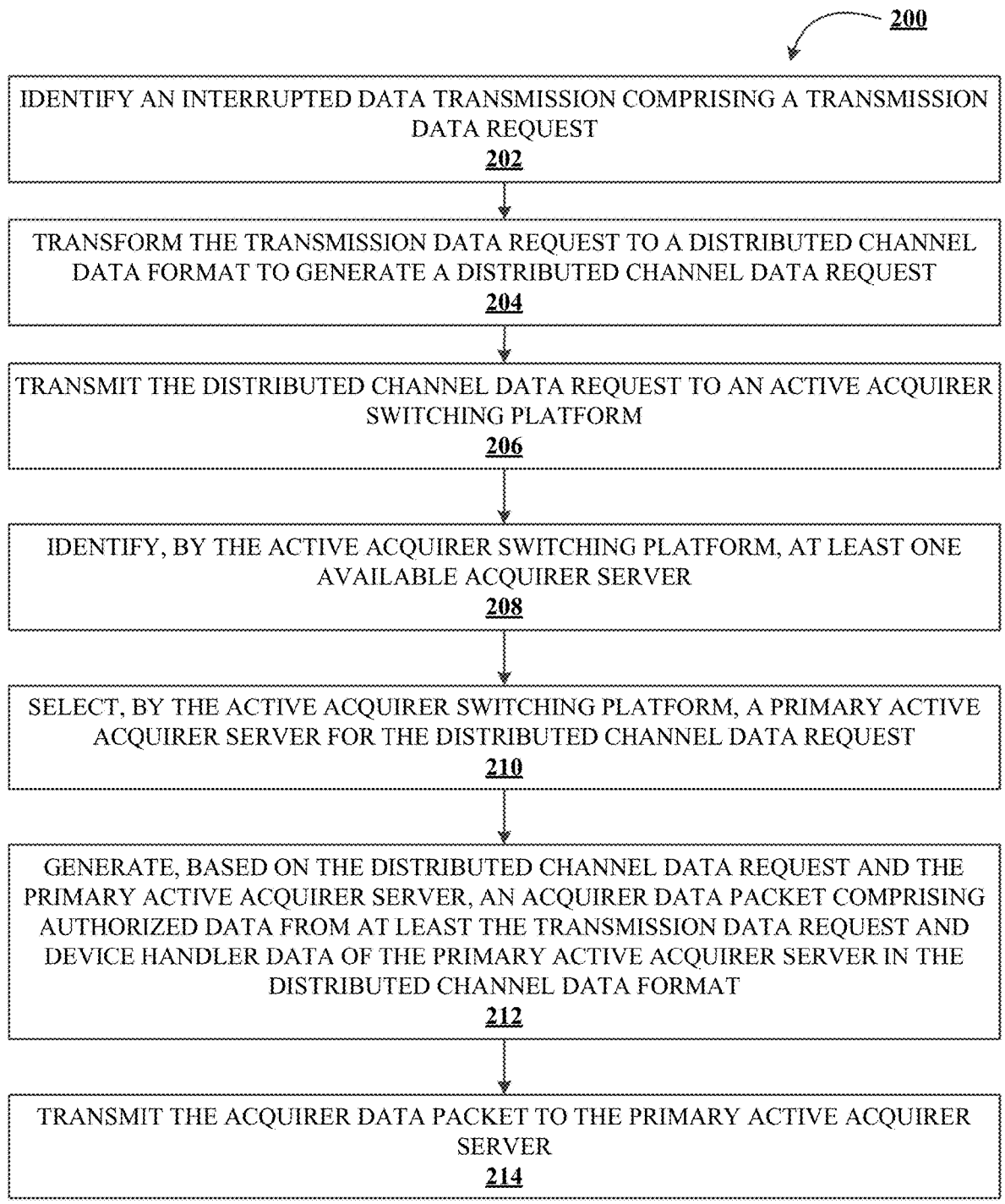
Figure 3:
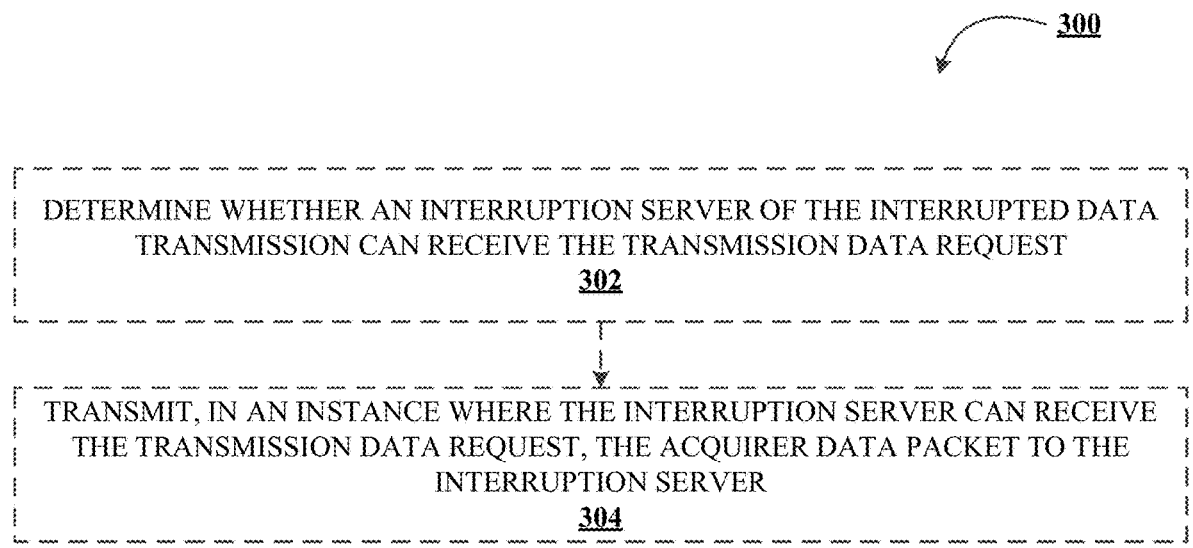
Figure 4:
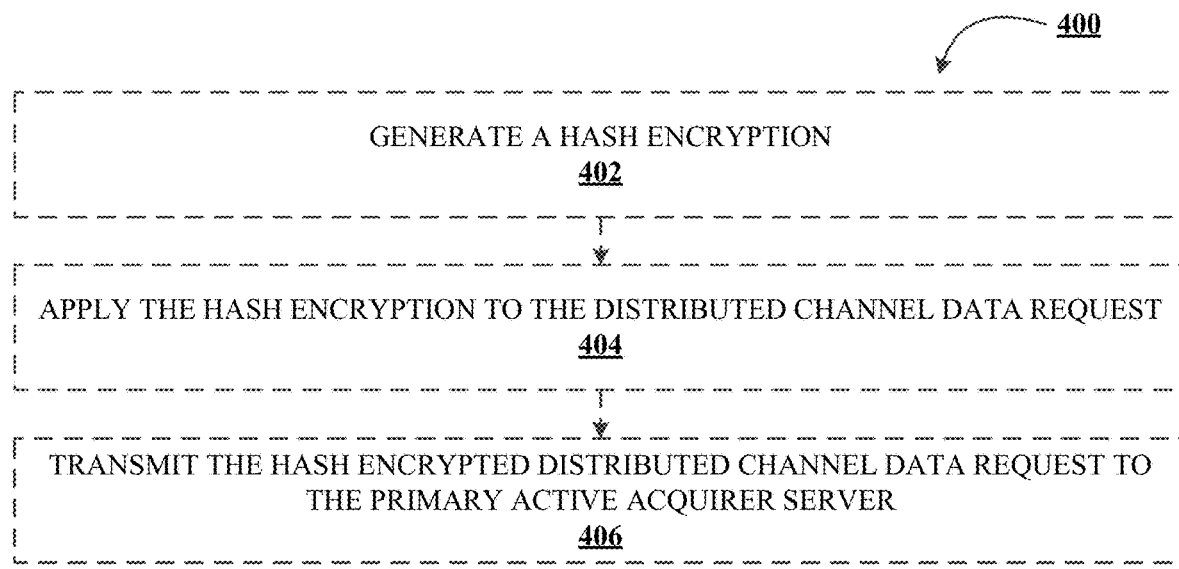
Figure 5:
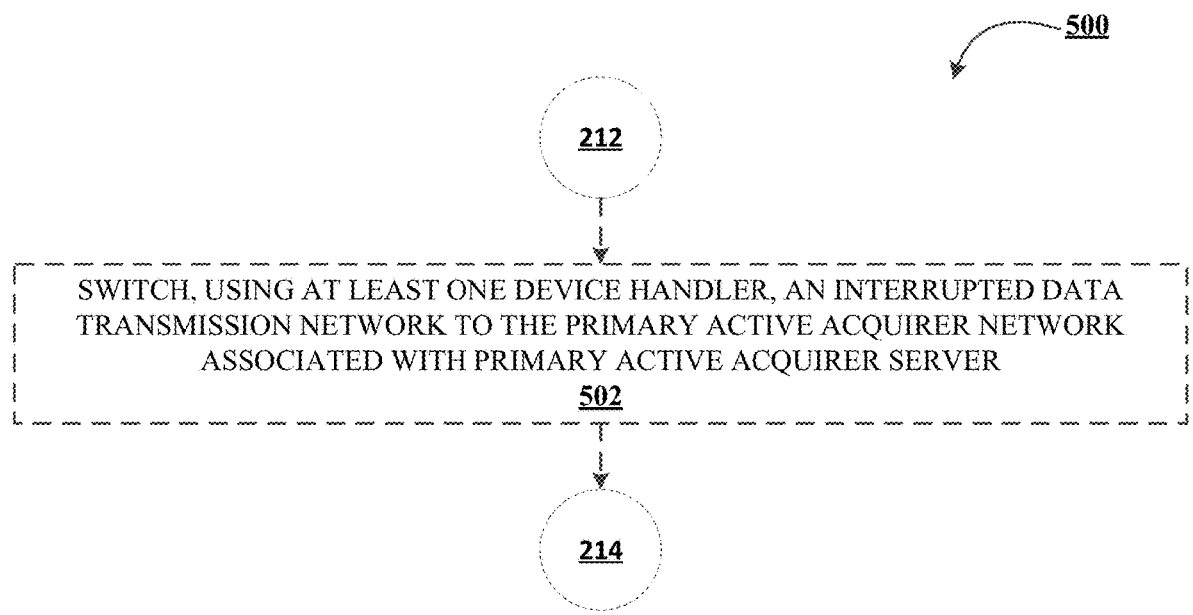
Figure 6:
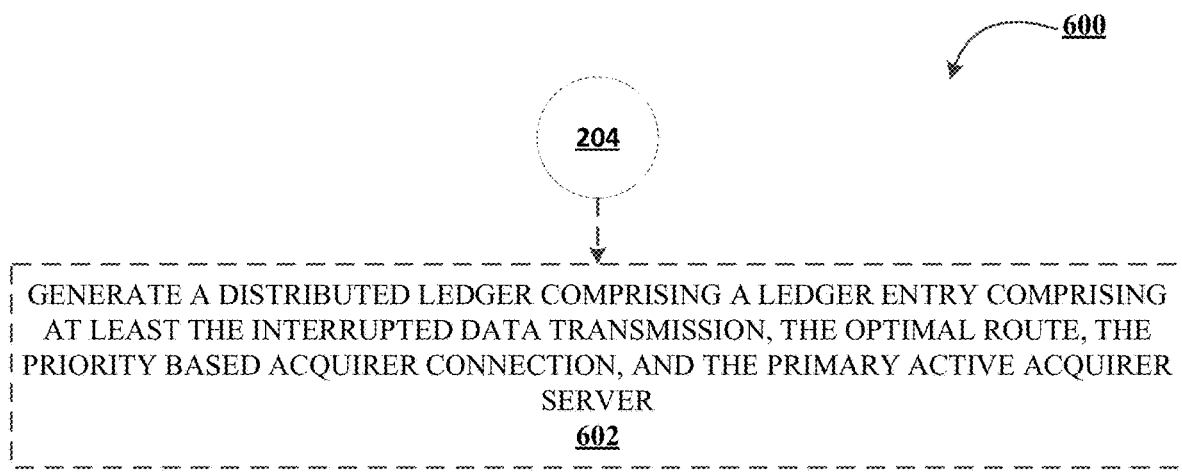
Figure 7:
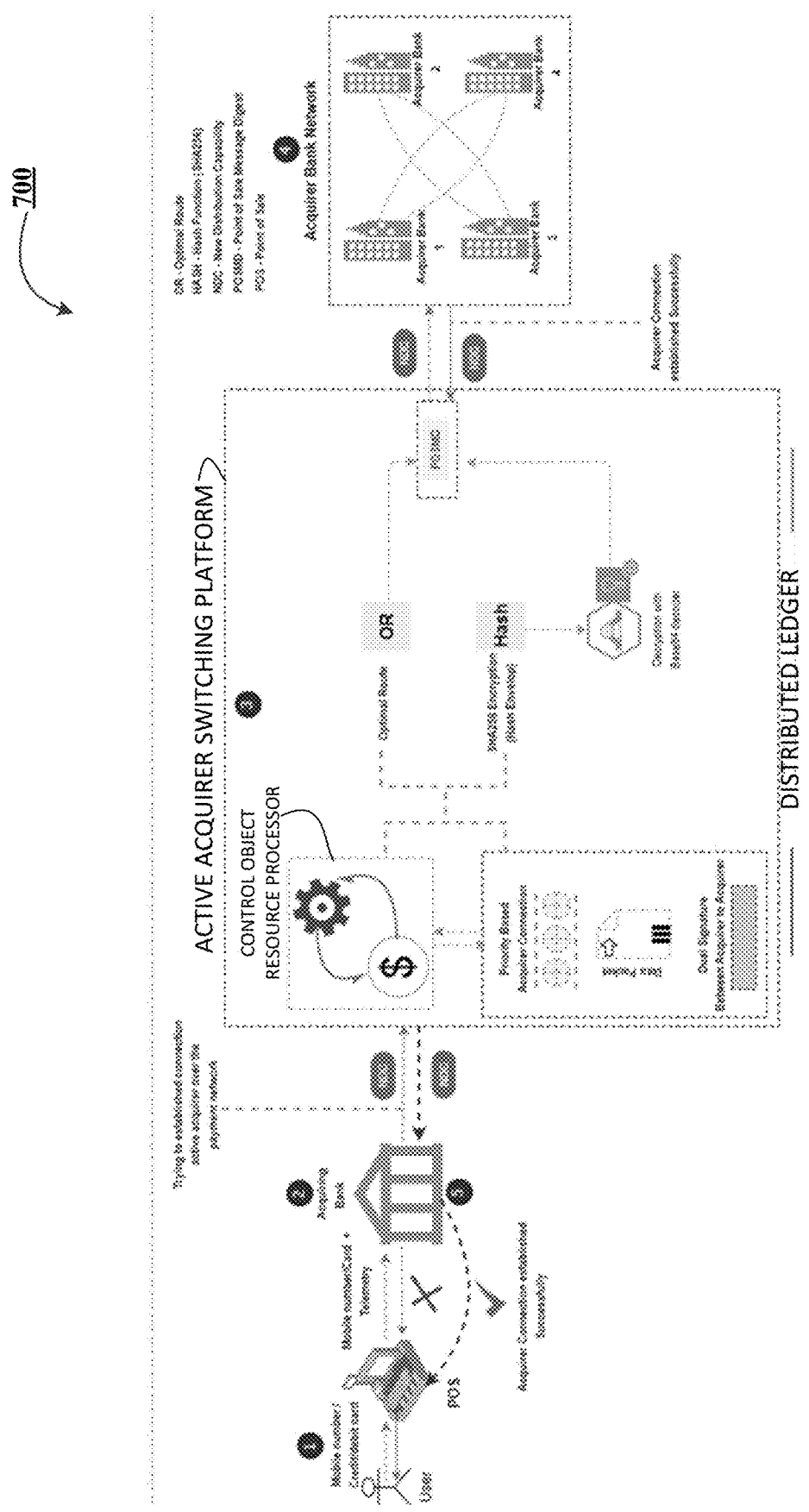

FIGS. 1A-1C illustrates technical components of an exemplary distributed computing environment for auto-establishing secure connections for interrupted data transmissions, in accordance with an embodiment of the disclosure;

FIG. 2 illustrates a process flow for auto-establishing secure connections for interrupted data transmissions, in accordance with an embodiment of the disclosure;

FIG. 3 illustrates a process flow for transmitting the acquirer data packet to the interruption server, in accordance with an embodiment of the disclosure;

FIG. 4 illustrates a process flow for transmitting the hash encrypted distributed channel data request to the primary active acquirer server, in accordance with an embodiment of the disclosure;

FIG. 5 illustrates a process flow for switching an interruption data transmission network to the primary active acquirer network, in accordance with an embodiment of the disclosure;

FIG. 6 illustrates a process flow for generating a distributed ledger comprising a ledger entry, in accordance with an embodiment of the disclosure; and FIG. 7 illustrates an exemplary architecture for auto-establishing secure connections for interrupted data transmissions for an exemplary resource transmission, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

During secure data transmissions (such as data transmissions comprising data and information that must be protected due to its importance and sensitivity) interruptions may occur when the data is transmitted to its intended recipient and the intended recipient's server is down or overloaded. Thus, and in order to prevent such secure data transmissions from being interrupted, a different acquirer server may be identified to receive some or all of the data in the original secure data transmission that was interrupted without downtime or delay. Thus, a system, computer-program product, and/or computer-implemented method for auto-establishing secure connections for interrupted data transmission which can accurately, efficiently, and securely identify an active acquirer server to receive data of the interrupted data transmission, and transmit the data of the interrupted data transmission in a secure and efficient manner.

Accordingly, the present disclosure provides for a system, a computer program product, and/or a computer-implemented method comprising an identification of an interrupted data transmission comprising a transmission data request; a transformation of the transmission data request to a distributed channel data format to generate a distributed channel data request; a transmission of the distributed channel data request to an active acquirer switching platform; an identification, by the active acquirer switching platform, of at least one available acquirer server; and a selection, by the active acquirer switching platform, of a primary active acquirer server for the distributed channel data request. Additionally, and in some embodiments, the primary active acquirer server is selected based on at least one of a priority based acquirer connection and an optimal route. Further, the system may further generate, based on the distributed channel data request and the primary active acquirer server, an acquirer data packet comprising authorized data from at least the transmission data request and device handler data of the primary active acquirer server in the distributed channel data format; and transmit the acquirer data packet to the primary active acquirer server.

Thus, and in other words, the disclosure provides a system that auto-establishes secure connections for interrupted data transmissions by first determining that an intended data transmission (such as a data transmission sent from a point of sale system to an intended financial institution) has been interrupted. Thus, and based on this interruption, the system will then automatically and in real time transmit the data transmission in a new distribution capability (NDC) format to a data transmission switching process. Within the data transmission switching process, the process will take the NDC formatted data transmission through a control object transmission processor which will establish a connection between an available system and transforms the data transmission to an acceptable format for the available system and the failed system. Additionally, and within the process, the system will use a priority based acquirer connection to determine which available systems are best or optimal based on geographic data. Additionally, the process may encrypt the NDC data transmission using a hash envelop to secure the data from bad actors interfering and capturing the data within the data transmission during this process. Once the available system has been selected, the system may establish a connection between the selected available system and the failed available system once the failed system is back online.

During this entire process, the front-end side for a user that originated the data transmission will be unaware of the failed data transmission.

What is more, the present disclosure provides a technical solution to a technical problem. As described herein, the technical problem includes establishing secure connections when interruptions occur in secure data transmissions. The technical solution presented herein allows for auto-establishing secure connections for interrupted data transmissions. In particular, the disclosure provided herein is an improvement over existing solutions to the establishment of secure connections in interrupted data transmissions, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for auto-establishing secure connections for interrupted data transmissions 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer—or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110.

Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for auto-establishing secure connections for interrupted data transmissions, in accordance with an embodiment of the disclosure. In some embodiments, a system (e.g., similar to one or more of the systems described herein with respect to FIGS. 1A-1C) may perform one or more of the steps of process flow 200. For example, a system (e.g., the system 130 described herein with respect to FIG. 1A-1C) may perform the steps of process 200.

As shown in block 202, the process flow 200 may include the step of identifying an interrupted data transmissions comprising a transmission data request. As used herein, the interrupted data transmission refers to a data transmission that has been interrupted during its transmission, such as when a recipient server is down; interference from devices that may cause interruptions or interference over a wireless network; outages to the recipient's system, data centers, and/or network; natural disasters that may cause outages in network transmissions or recipient systems; and/or the like. Thus, the interrupted data transmissions refer to any interruption that may cause a data transmission to not reach its intended recipient (e.g., an intended recipient's system or server). Therefore, and in some embodiments, the interrupted data transmission is based on a recipient server interruption, such as an outage to a recipient server, an overloading of the recipient server, and/or the like, whereby the recipient server may not be able to receive and/or process the data transmission and its transmission data request.

Additionally, and as used herein, the transmission data request of the interrupted data transmission refers to the packet of data transmitted over a network to the recipient's system that was interrupted as part of the interrupted data transmission. In some embodiments, such a transmission data request may comprise data or information regarding a resource transmission request (such as a request to transfer a resource amount from the recipient system to a merchant associated with a point of sale device that originally receives the data of the transmission data request and sends the transmission data request to the recipient system).

As shown in block 204, the process flow 200 may include the step of transforming the transmission data request to a distributed channel data format to generate a distributed channel data request. For example, the system may transform the transmission data request to a distributed channel data request by reformatting the data of the transmission data request using a distributed channel data format. Thus, and in some embodiments, the distributed channel data format allows for secure and efficient transmission of data within a distributed network, whereby the distributed channel data format allows the data of the transmission data request to be transmitted within a distributed network environment between different servers of different entities while still protecting secure data within the transmission data request and allowing only necessary information and data be revealed between the different servers. Additionally, and in some embodiments the distributed channel data format is a new distribution capability (NDC) format, which orchestrates data exchanging over a distributed channel (such as between a distributed network comprising multiple entities' servers and recipient components), which allows the exchange of data between end-to-end systems by using data exchange format message comprising a text-based format which may be easily read and understood between the multiple entities and their agents.

Thus, and by way of example, and where the transmission data request comprises a request for a resource transmission and is initially transmitted to a resource entity (such as a financial institution) associated with a user at a merchant's brick and mortar location (such as from a merchant's point of sale device). Thus, and by way of example, the transmission data request may comprise a request for a resource transmission from the user's resource account at the resource entity to the merchant of the point of sale device, but the data transmission may be interrupted at some point during the original data transmission to the resource entity's server, which may cause the interrupted data transmission. Thus, and based on this interrupted data transmission, the system may take the data of the transmission data request and transform the data to a distributed channel data request using the distributed channel data format (e.g., an NDC format), such that the data of the original transmission data request may be read and processed by a secondary resource entity's systems (e.g., a secondary or available resource entity's server), which is described in further detail below.

As shown in block 206, the process flow 200 may include the step of transmitting the distributed channel data request to an active acquirer switching platform. For example, the system may transmit the distributed channel data request to an active acquirer switching platform which is configured to identify an available acquirer server (e.g., a secondary or available resource entity's server) that would be the best to receive the distributed channel data request (e.g., allowing the least amount of downtime, delay, and most secure connection between the active acquirer server and the interrupted server once the interrupted server is back up and running).

Thus, the system may determine—using the active acquirer switching platform a plurality of active acquirer servers that are available currently to receive the distributed channel data request, and determine—among the plurality of active acquirer servers-a primary active acquirer server which is best for receiving the distributed channel data request. In some such embodiments, the active acquirer switching platform may comprise control object resource processor which establishes a connection with a new acquirer (i.e., the primary active acquirer) and transforms the distributed channel data request into a compatible mode with the dynamic device handler with the interrupted acquirer (e.g., associated with the interrupted data transmission). Thus, and in this manner, the control object resource processor is configured to establishes the connection with the primary active acquirer over the resource transmission network (e.g., between the failed or interrupted acquirer/resource entity's system and the primary active/secondary acquirer's system), such that the connection is in real time or near real time once the primary active acquirer is identified.

Additionally, the active acquirer switching platform may further comprise a priority-based acquirer connection which is configured to determine whether a pre-existing relationship between acquirers (e.g., the interrupted acquirer of the interrupted data transmission and other such secondary active acquirers that are currently available to receive the distributed channel data request), such as previously transmitted distributed channel data request for the interrupted acquirer, a pre-existing agreement within a resource network (e.g., financial institutions that have pre-existing agreements within the same network), and/or the like. In some embodiments, the priority-based acquirer connection may be based on a dual signature between acquirer to acquirer (e.g., interrupted acquirer and primary acquirer(s)), and/or based on an optimal route between acquirer and acquirer (e.g., interrupted acquirer and primary acquirer(s)).

In some embodiments, the dual signature between acquirer to acquirer comprises a dual signature shared between at least one active acquirer entity associated with the at least one active acquirer server and signature of an interrupted entity associated with the interrupted data transmission. In this manner, the system may link the interrupted data transmission and its associated transmission data request with the distributed channel data request that is transmitted to the primary active acquirer server. In some embodiments, previous instances of dual signatures between the interrupted server and an active acquirer server of the plurality of active acquirer servers currently available, then the system may identify the active acquirer server with the previous dual signature as the primary active acquirer server for the current instance as well.

Additionally, and in some embodiments, the optimal route is based on a geographic proximity between a server for a recipient server interruption and the primary active acquirer server. Thus, and in other words, the interrupted server of the interrupted data transmission and its geographic location may be used to determine the closest active acquirer server is the primary active acquirer server. In some embodiments, the system may rank the active acquirer servers based on geographic distances between the interrupted server (i.e., the recipient server interruption) and the plurality of active acquirer servers, and may identify the primary active acquirer server based on the highest ranked (or closest in geographic distance to the interrupted server) active acquirer server. In such embodiments, and based on this optimal route, the system may decrease a downtime and delays for the transmission data request to reach a primary active acquirer server when the intended interrupted server is down.

As shown in block 208, the process flow 200 may include the step of identifying, by the active acquirer switching platform, at least one available acquirer server. For example, the system may identify—by the active acquirer switching platform—at least one available acquirer server (or a plurality of active acquirer servers) that could potentially receive the distributed channel data request. In this manner, and in some embodiments, the system may analyze a network of acquirer servers associated with a network of financial institutions and determine which acquirer servers are currently available (e.g., are not undergoing maintenance, are not overburdened by current data transmissions, are not down, are not in a current outage, and/or the like). In some embodiments, and as used herein, the active acquirer server(s) may refer to computing servers, data centers, processors, and/or the like, which are configured to receive and process data within data transmissions over a network.

As shown in block 210, the process flow 200 may include the step of selecting, by the active acquirer switching platform, a primary active acquirer server for the distributed channel data request. For example, the system may select—based on the active acquirer server(s) identified in block 208 and based on the components of the active acquirer switching platform (e.g., optimal route, priority based acquirer connection, dual signature, control object resource processor, and/or the like)—a primary active acquirer server. In some embodiments, the system may select the primary active acquirer server based on identifying a single active acquirer server as having the optimal route (e.g., being the closest geographic proximity to the interrupted server), and based on the same single active acquirer server having the priority based acquirer connection and dual signature between acquirer to acquirer.

In some embodiments, and where there is a plurality of priority based acquirer connections (e.g., a plurality of active acquirer servers which have a pre-existing relationship or agreement and/or past dual signatures), then the system may rely on the optimal route in selecting the primary active acquirer server from the priority based connections (e.g., the closest geographic priority based connection server).

As shown in block 212, the process flow 200 may include the step of generating, based on the distributed channel data request and the primary active acquirer server, an acquirer data packet comprising authorized data from at least the transmission data request and device handler data of the primary active acquirer server in the distributed channel data format. For example, the system may generate an acquirer data packet which is a secure data packet (e.g., such as by encryption, which is described in further detail below with respect to FIG. 4) comprising the necessary data (e.g., required data for the distributed channel data request and for authorized information needed to integrate the two acquirer device handlers—the interrupted device handler and the primary device handler of the primary active acquirer server). In some embodiments, the acquirer data packet may comprise a point of sale message digest (POSMD), which comprises a message packet which has all the required and authorized information to integrate two different acquirer device handlers.

Additionally, and in some embodiments, the acquirer data packet may comprise a hash encryption to protect data of the initial interrupted data transmission which may not be necessary for the primary active acquirer server to process the transmission data request for transmitting the data back to the interrupted server at a later time. Thus, and in some embodiments, the hash encrypted data in the acquirer data packet may remain secure and private before the primary active acquirer server receives the active acquirer data packet and remain secure and private until the interrupted acquirer server receives the data packet at a later time when the interrupted acquirer server is back up and running. Such a process as that described herein allows for greater data security, greater efficiency in data transmission between an interrupted acquirer server and a primary active acquirer server, such that there is no downtime.

As shown in block 214, the process flow 200 may include the step of transmitting the acquirer data packet to the primary active acquirer server. Thus, the system may transmit the acquirer data packet to the primary active acquirer server efficiently and securely once the identification of the interrupted data transmission has occurred. In some such embodiments, the transmission of the acquirer data packet may occur in near real time to the interrupted data transmission, such that there is no downtime between the interrupted data transmission and when the primary active acquirer server receives the acquirer data packet, like there would have been if a primary active acquirer server had to be manually identified and the original transmission data packet had to be transformed to integrate between the interrupted acquirer entity and the primary active acquirer entity (such as to integrate the two different device handlers, to protect the correct data of the required and authorized information, and/or using an end-to-end data exchange format).

FIG. 3 illustrates a process flow 300 for transmitting the acquirer data packet to the interruption server, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300.

In some embodiments, and as shown in block 302, the process flow 300 may include the step of determining whether an interruption server of the interrupted data transmission can receive the transmission data request. For example, and in some embodiments, the system may determine whether an interruption server can receive the transmission data request, such as at a later time after the primary active acquirer server has received the acquirer data packet. In this manner, the system may actively and continuously monitor the wellbeing and current status of the interruption server. In an instance where the interruption server is back up and running and is not overloaded, the system may automatically and dynamically transmit the acquirer data packet to the interruption server for processing. Thus, and in some embodiments, the interruption server can receive the interrupted data transmission and its transmission data request at a later time (such as a later time from the original interruption) and/or at a later time than the processes described herein with respect to FIG. 2 and its associated blocks.

In some embodiments, and as shown in block 304, the process flow 300 may include the step of transmitting, in an instance where the interruption server can receive the transmission data request, the acquirer data packet to the interruption server. For instance, the system may transmit the acquirer data packet to the interruption server such that the original data transmission request may be completed when the interruption server is back up and running. For example, and where the original transmission data request comprises a resource transmission from a user's resource account to a merchant resource account, and upon receiving the acquirer data packet at the interruption server, then the entity associated with the interruption server (e.g., the entity in control of the user's resource account) may complete the resource transmission request.

FIG. 4 illustrates a process flow 400 for transmitting the hash encrypted distributed channel data request to the primary active acquirer server, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-IC) may perform the steps of process 400.

In some embodiments, and as shown in block 402, the process flow 400 may include the step of generating a hash encryption. For example, and in some embodiments, the system may generate a hash encryption, such as a hash envelop, for the distributed channel data request. In some embodiments, the hash encryption may comprise a secure hash algorithm (SHA), such as a SHA-256 algorithm, to protect the data of the distributed channel data request and the associated data packets (such as an acquirer data packet).

In some embodiments, and as shown in block 404, the process flow 400 may include the step of applying the hash encryption to the distributed channel data request. In some embodiments, the system may apply the hash encryption described above with respect to block 402 to the distributed channel data request, whereby such an encrypted distributed channel data request may then be used to generate the acquirer data packet for the primary active acquirer server.

In some embodiments, and as shown in block 406, the process flow 400 may include the step of transmitting the hash encrypted distributed channel data request to the primary active acquirer server. In some embodiments, once the hash encrypted distributed channel data request has been generated, the system may collect all the required data (such as device handler data) and format the hash encrypted distributed channel data in distributed channel data format (e.g., NDC) to generate the acquirer data packet for transmission to the primary active acquirer server.

FIG. 5 illustrates a process flow 500 for switching an interruption data transmission network to the primary active acquirer network, in accordance with an embodiment of the disclosure. In some embodiments, a system (e.g., similar to one or more of the systems described herein with respect to FIGS. 1A-IC) may perform one or more of the steps of process flow 500. For example, a system (e.g., the system 130 described herein with respect to FIG. 1A-IC) may perform the steps of process 500.

In some embodiments, and as shown in block 502, the process flow 500 may include the step of switching, using at least one device handler, an interrupted data transmission network to the primary active acquirer network associated with primary active acquirer server. For example, and in some embodiments, the system may switch-using the at least one device handler—an interrupted data transmission network to the primary active acquirer server, such as by switching the resource network (e.g., a payment network in an instance where the interrupted data transmission comprises a resource transmission request) right after all the required information or data is collected from the interrupted data transmission network. In some embodiments, the switching of the interrupted data transmission network to the primary active acquirer network may comprise one device handler between each network, such that there are two device handlers between the interrupted data transmission network and the primary active acquirer network. In some such embodiments, the two device handlers may require a data packet (such as an acquirer data packet) comprising the required data (e.g., data required for the device handlers to communicate accurately and efficiently) to integrate the two device handlers for proper and efficient network switching.

In some such embodiments, the process described herein with respect to block 502 may occur after the process described herein with respect to block 212. Additionally, and in some such embodiments, the process described herein with respect to block 502 may occur prior to the process described herein with respect to block 214 (and may in some instances cause the process described with respect to block 214).

FIG. 6 illustrates a process flow 600 for generating a distributed ledger comprising a ledger entry, in accordance with an embodiment of the disclosure. In some embodiments, a system (e.g., similar to one or more of the systems described herein with respect to FIGS. 1A-1C) may perform one or more of the steps of process flow 600. For example, a system (e.g., the system 130 described herein with respect to FIG. 1A-1C) may perform the steps of process 600.

In some embodiments, and as shown in block 602, the process flow 600 may include the step of generating a distributed ledger comprising a ledger entry comprising at least the interrupted data transmission, the optimal route, the priority based acquirer connection, and the primary active acquirer server. For example, and in some embodiments, the system may generate a distributed ledger comprising a ledger entry for the interrupted data transmission identification, the optimal route determination, the priority based acquirer connection determination, and/or the primary active acquirer server identification. In some embodiments, the system may additionally and/or alternatively generate distributed ledger for each of the steps described herein and their respective blocks (e.g., the process described with respect to blocks 202-214, and in some embodiments, the process described with respect to blocks 302-304, 402-406, and/or 502). Thus, and in some embodiments, a distributed ledger may comprise each of the steps taken to between identifying the interrupted data transmission, determining available acquirer server(s), selecting the primary active acquirer server, transmitting the acquirer data packet to the primary active acquirer server, and/or transmitting the acquirer data packet back to the interruption server. Thus, and in some embodiments, the process described herein with respect to block 602 may occur after the processes described herein with respect to block 204, but may additionally include—in some embodiments—the process described herein may continue from blocks 204-214 and 302-304.

FIG. 7 illustrates an exemplary architecture 700 for auto-establishing secure connections for interrupted data transmissions for an exemplary resource transmission, in accordance with an embodiment of the disclosure. In some embodiments, a system (e.g., similar to one or more of the systems described herein with respect to FIGS. 1A-IC) may perform one or more of the steps of architecture 700. For example, a system (e.g., the system 130 described herein with respect to FIG. 1A-IC) may perform the steps of architecture 700.

Thus, and as shown in exemplary architecture 700, a resource transmission request may be transmitted from a point of sale device (at step 1), such as from a merchant's point of sale device to an intended recipient entity. Such an intended recipient entity may comprise a server which comprises an interruption to its normal processes, such that an interrupted data transmission comprising the resource transmission request cannot be processed by the intended recipient. Upon identifying the interrupted data transmission (at step 2), the system may use the active acquirer switching platform (at step 3) and its associated components, to identify available active acquirer servers, determine/identify a primary active acquirer server, and generate an acquirer data packet to transmit to the primary active acquirer server (e.g., at step 4). During the process of transmitting the acquirer data packet to the primary active acquirer server and/or after transmitting the acquirer data packet to the primary active acquirer server, the system may monitor the interruption server (from step 2) to determine when it is active, up and running, and/or can handle the resource transmission request, and in instance where the interruption server can handle the resource transmission request, the system may transmit acquirer data packet to the interruption server from the primary active acquirer server (at step 5).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for auto-establishing secure connections for interrupted data transmissions, the system comprising:
    a processing device;
    a non-transitory storage device containing instructions when executed by the processing device, causes the processing device to perform the steps of:
    identify an interrupted data transmission comprising a transmission data request;
    transform the transmission data request to a distributed channel data format to generate a distributed channel data request;
    transmit the distributed channel data request to an active acquirer switching platform;
    identify, by the active acquirer switching platform, at least one available acquirer server;
    select, by the active acquirer switching platform, a primary active acquirer server for the distributed channel data request,
        wherein the primary active acquirer server is selected based on at least one of a priority based acquirer connection and an optimal route;
    generate, based on the distributed channel data request and the primary active acquirer server, an acquirer data packet comprising authorized data from at least the transmission data request and device handler data of the primary active acquirer server in the distributed channel data format; and
    transmit the acquirer data packet to the primary active acquirer server.

2. The system of claim 1, wherein the processing device is further configured to perform the steps of:
    determine whether an interruption server of the interrupted data transmission can receive the transmission data request; and
    transmit, in an instance where the interruption server can receive the transmission data request, the acquirer data packet to the interruption server.

3. The system of claim 1, wherein the interrupted data transmission is based on a recipient server interruption.

4. The system of claim 1, wherein the distributed channel data format is a new distribution capability format.

5. The system of claim 1, wherein the optimal route is based on a geographic proximity between a server for a recipient server interruption and the primary active acquirer server.

6. The system of claim 1, wherein the priority based acquirer connection comprises a dual signature shared between at least one active acquirer entity associated with the at least one active acquirer server and an interrupted entity associated with the interrupted data transmission.

7. The system of claim 1, wherein the processing device is further configured to perform the steps of:
    generate a hash encryption;
    apply the hash encryption to the distributed channel data request; and
    transmit the hash encrypted distributed channel data request to the primary active acquirer server.

8. The system of claim 1, wherein the processing device is further configured to perform the steps of:
    switch, using at least one device handler, an interrupted data transmission network to the primary active acquirer network associated with primary active acquirer server.

9. The system of claim 1, wherein the processing device is further configured to perform the steps of:
    generate a distributed ledger comprising a ledger entry comprising at least the interrupted data transmission, the optimal route, the priority based acquirer connection, and the primary active acquirer server.

10. A computer program product for auto-establishing secure connections for interrupted data transmissions, the computer program product comprising a non-transitory computer-readable medium comprising code causing an apparatus to:
    identify an interrupted data transmission comprising a transmission data request;
    transform the transmission data request to a distributed channel data format to generate a distributed channel data request;
    transmit the distributed channel data request to an active acquirer switching platform;
    identify, by the active acquirer switching platform, at least one available acquirer server;
    select, by the active acquirer switching platform, a primary active acquirer server for the distributed channel data request,
        wherein the primary active acquirer server is selected based on at least one of a priority based acquirer connection and an optimal route;
    generate, based on the distributed channel data request and the primary active acquirer server, an acquirer data packet comprising authorized data from at least the transmission data request and device handler data of the primary active acquirer server in the distributed channel data format; and
    transmit the acquirer data packet to the primary active acquirer server.

11. The computer program product of claim 10, wherein the interrupted data transmission is based on a recipient server interruption.

12. The computer program product of claim 10, wherein the distributed channel data format is a new distribution capability format.

13. The computer program product of claim 10, wherein the priority based acquirer connection comprises a dual signature shared between at least one active acquirer entity associated with the at least one active acquirer server and an interrupted entity associated with the interrupted data transmission.

14. The computer program product of claim 10, wherein the code further causes the apparatus to:
    generate a hash encryption;
    apply the hash encryption to the distributed channel data request; and
    transmit the hash encrypted distributed channel data request to the primary active acquirer server.

15. The computer program product of claim 10, wherein the code further causes the apparatus to:
    switch, using at least one device handler, an interrupted data transmission network to the primary active acquirer network associated with primary active acquirer server.

16. A computer-implemented method for auto-establishing secure connections for interrupted data transmissions, the computer-implemented method comprising:
- identifying an interrupted data transmission comprising a transmission data request;
- transforming the transmission data request to a distributed channel data format to generate a distributed channel data request;
- transmitting the distributed channel data request to an active acquirer switching platform;
- identifying, by the active acquirer switching platform, at least one available acquirer server;
- selecting, by the active acquirer switching platform, a primary active acquirer server for the distributed channel data request,
  - wherein the primary active acquirer server is selected based on at least one of a priority based acquirer connection and an optimal route;
- generating, based on the distributed channel data request and the primary active acquirer server, an acquirer data packet comprising authorized data from at least the transmission data request and device handler data of the primary active acquirer server in the distributed channel data format; and
- transmitting the acquirer data packet to the primary active acquirer server.

17. The computer-implemented method of claim 16, wherein the interrupted data transmission is based on a recipient server interruption.

18. The computer-implemented method of claim 16, wherein the distributed channel data format is a new distribution capability format.

19. The computer-implemented method of claim 16, wherein the priority based acquirer connection comprises a dual signature shared between at least one active acquirer entity associated with the at least one active acquirer server and an interrupted entity associated with the interrupted data transmission.

20. The computer-implemented method of claim 16, further comprising:
- generating a hash encryption;
- applying the hash encryption to the distributed channel data request; and
- transmitting the hash encrypted distributed channel data request to the primary active acquirer server.

* * * * *